United States Patent
Berzon et al.

(10) Patent No.: US 8,512,604 B2
(45) Date of Patent: Aug. 20, 2013

(54) PHOTOCHROMIC COATING EXHIBITING IMPROVED PERFORMANCE AND REDUCED YELLOWNESS

(75) Inventors: Ronald Berzon, Saint Petersburg, FL (US); Leo Charles Collett, Dunedin, FL (US)

(73) Assignees: Essilor International (Compagnie Generale d'Optique), Charenton-le-Pont (FR), part interest; Transitions Optical, Inc., Pinellas Park, FL (US), part interest ( * ) Notice: Subject to any disclaimer, the term of this patent is extended or adjusted under 35 U.S.C. 154(b) by 61 days.

(21) Appl. No.: 12/999,080

(22) PCT Filed: Jun. 18, 2009

(86) PCT No.: PCT/US2009/047806
§ 371 (c)(1),
(2), (4) Date: Jan. 26, 2011

(87) PCT Pub. No.: WO2009/155425
PCT Pub. Date: Dec. 23, 2009

(65) Prior Publication Data
US 2011/0115108 A1    May 19, 2011

(51) Int. Cl.
*G02B 5/23*      (2006.01)
(52) U.S. Cl.
USPC ............ 252/586; 526/90; 526/220; 526/319; 526/320; 526/321; 526/323.1; 526/328
(58) Field of Classification Search
USPC .................. 252/586; 526/90, 220, 319, 320, 526/321, 323.1, 328
See application file for complete search history.

(56) References Cited

U.S. PATENT DOCUMENTS

| 5,531,940 | A | 7/1996 | Gupta et al. |
| 5,621,017 | A | 4/1997 | Kobayakawa et al. |
| 6,187,444 | B1 | 2/2001 | Bowles, III et al. |
| 6,268,055 | B1 | 7/2001 | Walters et al. |
| 6,432,544 | B1 | 8/2002 | Stewart et al. |
| 6,506,488 | B1 | 1/2003 | Stewart et al. |
| 6,602,603 | B2 | 8/2003 | Welch et al. |
| 6,639,039 | B1 | 10/2003 | Fries et al. |
| 6,863,844 | B2 | 3/2005 | Engardio et al. |
| 7,036,932 | B2 | 5/2006 | Boulineau et al. |

(Continued)

FOREIGN PATENT DOCUMENTS

DE    198 05 977 A1    8/1999
JP    2004076411        3/2004

OTHER PUBLICATIONS

Akzo Nobel's Initiators for High Polymers, Jun. 2006.*

*Primary Examiner* — Vu A Nguyen
(74) *Attorney, Agent, or Firm* — Keusey & Associates, P.C.

(57) ABSTRACT

An acrylate-based optical coating composition containing a blend of monomers, a metal salt, a Hindered Amine Light Stabilizer (HALS), an antioxidant (AO), an initiator and a photochromic dye. The initiator has a range of free radical energy that is below a predetermined level. The cure process is controlled by the catalyst and initiator in combination with the HALS and AO to avoid deleterious reactions that can increase yellowness. The composition is well suited to be applied to a lens and cured in the mold to form a coating with reduced yellowness having high adhesion and abrasion-resistant properties. A photochromic segmented bifocal lens is produced with low photochromic fatigue and favorable % T values.

15 Claims, 1 Drawing Sheet

(56) References Cited

U.S. PATENT DOCUMENTS

| | | |
|---|---|---|
| 7,189,456 B2 | 3/2007 | King |
| 7,258,437 B2 | 8/2007 | King et al. |
| 7,820,081 B2 * | 10/2010 | Chiu et al. .................. 264/1.7 |
| 7,820,082 B2 * | 10/2010 | Berzon et al. ................ 264/1.8 |
| 2007/0045596 A1 * | 3/2007 | King et al. .................... 252/582 |
| 2007/0122626 A1 | 5/2007 | Qin et al. |
| 2007/0138664 A1 | 6/2007 | Chen et al. |
| 2007/0138665 A1 | 6/2007 | Chen et al. |
| 2007/0138667 A1 * | 6/2007 | Dang et al. ................... 264/1.32 |
| 2008/0023138 A1 | 1/2008 | Zheng |

\* cited by examiner

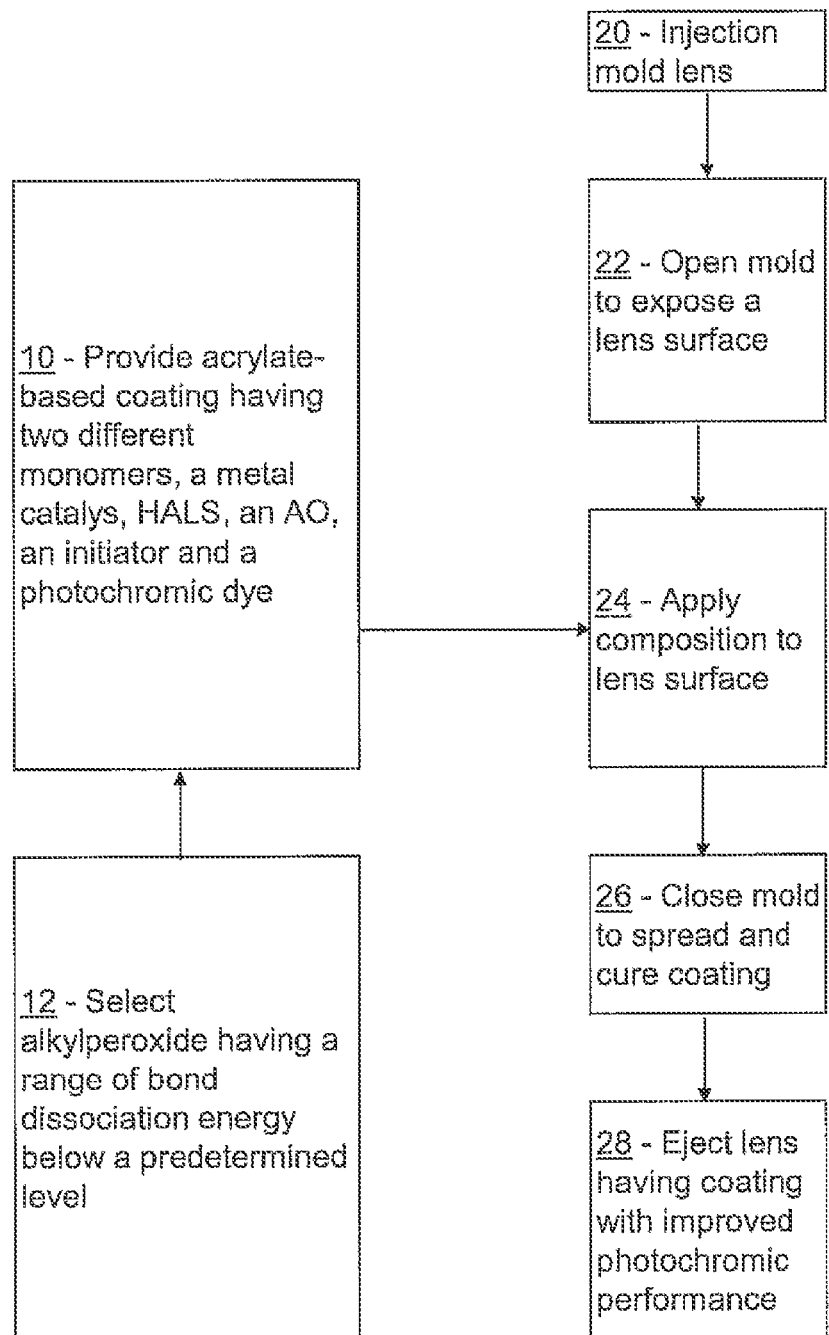

PHOTOCHROMIC COATING EXHIBITING IMPROVED PERFORMANCE AND REDUCED YELLOWNESS

This application is the U.S. National Stage of International Stage PCT application Ser. No. PCT/US2009/047806 filed Jun. 18, 2009.

BACKGROUND OF THE INVENTION

1. Field of the Invention

The invention relates to a photochromic coating and to a method for making a photochromic polycarbonate lens using the coating. More particularly, the composition is applied to a lens and cured in the mold to form a coating with reduced yellowness having high adhesion and abrasion-resistance. The coating will exhibit excellent photochromic darkening and fatigue properties.

2. Description of the Related Art

Injection molded polycarbonate ophthalmic lenses are lightweight and possess excellent mechanical properties. Photochromic dyes are incorporated into certain lenses to enhance their optical properties by automatically lightening or darkening based on the amount and type of light that they receive. Since the photochromic dye molecules can decompose when exposed to the heat of the injection molding process, such dyes need to be introduced on to the lens after the injection molding step. One method is to incorporate the photochromic dye into a coating composition and apply it to a lens surface via dip coating or spin coating. The surface discontinuity of bifocal and trifocal segmented lenses are not well suited to these typical coating processes. The viscous coating material builds-up at the segment which results in an undesirable darker color at the segment when exposed to UV light. A prior art process utilizing a photochromic polyurethane coating is shown in U.S. Pat. No. 6,187,444 and U.S. Pat. No. 7,258,437. These approaches do not use organic peroxides in the coating compositions, rather they utilize condensation reactions.

Photochromic (PhCh) semi-finished straight-top SFST lenses can be made by injection molding polycarbonate (PC) behind a photochromic wafer. The wafer can be a tri-layer of PC/PhCh/PC. VisionEase U.S. Pat. No. 7,036,932 and U.S. Published Patent Application 2007/0122626 describes such a product.

Another method is to overmold a bifocal on top of a lens as described in U.S. Pat. No. 7,258,437. Generally, the overmold casting solution is not photochromic, as mentioned in U.S. Pat. No. 5,531,940, with the lens optionally containing photochromics. As described in U.S. Pat. No. 5,531,940 and JP Appl. 2004-076411 the overmolding solution can contain photochromic materials and the lens can be non-photochromic, or a combination of the two. The overmold solution can be cured by either UV, thermal or a combination of each, for example as described in U.S. Pat. No. 6,863,844, U.S. Pat. No. 6,602,603 and U.S. Pat. No. 5,621,017. With these ensembles the desirable high impact nature of the polycarbonate can be compromised because the overmold layer replaces a portion of the total lens thickness.

With the current methods of depositing viscous urethane photochromic coatings as described in U.S. Pat. No. 7,189,456, it is extremely difficult, if not impossible, to produce a polycarbonate photochromic semi-finished segmented (bifocal or trifocal) optical lens. The viscous coating material will build-up at the segment which results in an undesirable darker color at the segment when exposed to UV light. Other such photochromic coatings are Aminoplast melamine PhCh coatings, mentioned in U.S. Pat. Nos. 6,506,488 and 6,432,544. Thermal initiators are used to prepare polymers, while acid catalysts (eg. p-TSA) cure the photochromic Cymel resin mixture. A photochromic epoxy coating is described in U.S. Pat. No. 6,268,055. Thermal initiators are only used to prepare the polymers, no peroxidic initiator is used to cure the epoxy PhCh coating.

Another method is proposed in U.S. Published Patent Application 2007/0138665 where a polycarbonate lens substrate is injection molded. The mold block opens and a few drops of a coating liquid are applied to the front surface of the polycarbonate lens. The mold block then closes. This serves two (2) purposes. First, when the mold block closes, it spreads the coating over the front (CX) surface of the polycarbonate lens to provide a uniform thickness. Secondly, the mold block will provide suitable heat to cure the coating formulation. When the coating is a photochromic coating, the organic peroxide thermal initiator (t-butylperoxybenzoate) appears to damages the photochromic molecules resulting in a visible yellow color.

Accordingly, there is a need to produce coatings with low yellow color. More particularly, it would be desirable to provide a photochromic coating composition with reduced yellowness, and a method for in-mold coating, especially for coating bifocal or trifocal segmented lenses.

In addition, there is a need for a photochromic coating formulation and application method which will result in good lens transparency, a high level of photochromic performance and minimal photochromic fatigue.

SUMMARY OF THE INVENTION

It is therefore an object of the invention to provide a coating composition and in-mold coating process that provides a cured coating with low yellowness.

It is a further object to control the curing process to minimize molecular degradation through careful selection of an organic peroxide initiator.

It is another object to provide a photochromic coating composition in which the photochromic molecules remain intact and are not damaged during the curing process.

It is yet a further object to identify a range of radical energy levels associated with the initiators that achieves a fast cure times without negatively interacting with other compounds.

It is another object of the invention to specify organic peroxide initiators having a radical energy level below about 113 kcal/mol.

It is an object of the present invention to provide a photochromic coating which exhibits improved photochromic performance.

It is another object to provide a coating that has minimal photochromic fatigue.

It is yet a further object to provide a photochromic coating which is suitable for use in an in-mold coating process.

It is another object to provide a suitably coated photochromic bifocal lens.

These and other related objects according to one embodiment of the invention are achieved by a thermally curable photochromic coating composition comprising a metal salt catalyst; a Hindered Amine Light Stabilizer (HALS); an antioxidant; an initiator; a photochromic dye; and a mixture having two different monomers. The monomers are selected from the group consisting of (a) monofunctional (meth)acrylate; (b) difunctional (meth)acrylate; (c) a combination of a monofunctional (meth)acrylate and a difunctional (meth) acrylate; (d) multifunctional (meth)acrylate; and (e) aliphatic urethane diacrylate.

According to a further embodiment, there is provided a method for manufacturing an injection molded thermoplastic photochromic bifocal lens. Initially, there is provided an acrylate-based photochromic coating composition including two different types of monomers, a metal salt catalyst, a Hindered Amine Light Stabilizer (HALS), an antioxidant, an initiator and a photochromic dye. Next molten thermoplastic is injected into an edge-gated bifocal-lens forming cavity of an injection molding machine to provide a bifocal lens substrate. The mold is opened at a time when the bifocal lens is rigid enough to retain its shape. The photochromic composition is applied onto the bifocal lens substrate. Next, the mold is closed to spread the photochromic composition into a uniformly thin layer so that residual heat from the molding machine cures the photochromic composition into a coating with low photochromic fatigue and reduced yellowing. The photochromic coating is applied across a segmented surface of the bifocal lens to a thickness in the range from about 1 to 10 µm, and wherein the photochromic fatigue is less than 15% and the % T dark is less than 16%.

The HALS is propanedioic acid [4-(methoxyphenyl)-methylene]-bis-1,2,2,6,6-pentamethyl-4-piperidinyl) ester or bis(1,2,2,6,6-pentamethyl-4-piperidinyl)-[[3,5-bis-(1,1-dimethylethyl)-4-hydroxyphenyl]methyl]butylmalonate. The antioxidant is a sterically hindered phenolic compound and preferably a pentaerythritol tetrakis[3-(3,5-di-tert-butyl-4-hydroxyphenyl)propionate]hindered phenolic compound. The initiator is an organic peroxide which presents a free radical energy less than about 113 kcal/mol at 298 K, preferably t-amylperoxy-2-ethylhexyl carbonate organic peroxide or t-butylperoxy-2-ethylhexylcarbonate.

In a coating according another embodiment, the monomers of (a) monofunctional (meth)acrylate; (b) difunctional (meth)acrylate; and (c) a combination of a monofunctional (meth)acrylate and a difunctional (meth)acrylate are present in an amount from 10% to 25% by weight. The monomers of (d) multifunctional (meth)acrylate are present in an amount from 20% to 40% by weight. The monomers of (e) aliphatic urethane diacrylate are present in an amount from 50% to 70% by weight. The metal salt is present in an amount from 0.10 parts per hundred monomer (phm) to 0.30 phm. The Hindered amine light stabilizer (HALS) is present in an amount from 1.00 phm to 5.00 phm. The antioxidant is present in an amount from 0.20 phm to 0.50 phm. The initiator is present in an amount from 1.00 phm to 2.00 phm and the photochromic dye is presents in an amount from 2.00 phm to 5.00 phm.

In a coating according to a further embodiment, the mixture of monomers includes isobornylacrylate present in an amount of 5% by weight, hydroxypropylmethacrylate preferably HPMA present in an amount of 10% by weight, aliphatic urethane diacrylate present in an amount of 18% by weight, hexafunctional aliphatic urethane acrylate present in an amount of 33% by weight, and aliphatic urethane diacrylate present in an amount of 34% by weight. The metal salt is tin-2-ethylhexanoate present in an amount of 0.14 phm. The Hindered amine light stabilizer (HALS) comprises bis(1,2,2,6,6-pentamethyl-4-piperidinyl)-[[3,5-bis-(1,1-dimethylethyl)-4-hydroxyphenyl]methyl]butylmalonate present in an amount of 1 phm. The antioxidant comprises pentaerythritol tetrakis[3-(3,5-di-tert-butyl-4-hydroxyphenyl)propionate] hindered phenolic compound present in an amount of 0.25 phm. The initiator comprises t-amylperoxy-2-ethylhexyl carbonate organic peroxide present in an amount of 1.5 phm and the photochromic dye is present in an amount of 0.25 phm.

BRIEF DESCRIPTION OF THE DRAWINGS

The advantages, nature, and various additional features of the invention will appear more fully upon consideration of the illustrative embodiments now to be described in detail in connection with accompanying drawings. In the drawings:

FIG. 1 is a flowchart outlining the steps for an in-mold application of an acrylate-based coating to manufacture a photochromic lens with low yellowness.

DETAILED DESCRIPTION OF PREFERRED EMBODIMENTS

Thermoplastic lenses must be extremely clean before they can be coated. In the regular lens coating process, after the lenses are taken out of mold and degated, they have to be transferred and go through several different cleaning tanks before being coated. The coatings often require heat or UV light in order to cure. The transfer, cleaning, coating and curing operations utilize vast amounts of space and have high power demands to operate conveyors, pumps, heaters and curing ovens. That adds to the cost of the finished product. Accordingly, it would be desirable to coat a lens soon after it is formed by injection molding. In contrast to the prior art, a lens can be coated in-mold within 1 or 2 minutes of initial environmental contact before ejection or degating, thereby eliminating those operations as contamination sources.

According to one embodiment of the invention, a photochromic coating formulation is provided. The coating formulation contains (1) a photochromic dye; (2) an antioxidant (AO); (3) a metal salt catalyst; (4) an initiator; (5) a hindered amine light stabilizer (HALS), and (6) a blend of monomers.

An embodiment of the lens coating process according to the invention will be characterized by the following steps. In the cooling stage of the lens molding, the mold will open for coating deposition. The mold can open as soon as the lens substrate is rigid enough to sustain mold opening. That is, the lens shape which determines the degree of aberration and power, will resist deformation under mold depressurization and vacuum forces. The coating is deposited as an unpressurized coating solution onto the lens substrate. The mold is reclamped to contact the coating with the upper mold insert and spread an even layer over the lens surface. The coating spread pressure is directed in exactly the same direction and manner as the lens forming clamp pressure. Once closed the coating is heated from below by the lens substrate, and from above by the mold insert. A 1-5 minute coating cure phase is provided while the lens achieves sufficient solidification to be ejected from injection molding machine.

According to one embodiment of the invention, our proposed solution is to utilize the above noted process with a coating composition containing a dye(s) and an organic peroxide and a metal catalyst. A thermal initiator will be chosen that provides a tinted coating with minimal yellow color, and wherein the tint could be choosen from cosmetic dyes, tint dyes, photochromic dyes, dichroic dyes and combination thereof. More specifically, per step 12, the initiator is an organic peroxide class material having a radical energy that is lower than about 113 kcal/mol at 298 degrees K. The coating composition is formulated in step 10 and may optionally contain an optical dye. Such a composition produces, after ejection from the injection molding machine, a semi-finished lens wherein the convex side is provided with a coating without a yellow color defect. A complete description of the composition components and examples of particular coating formulations will now be presented.

Organic peroxides are known initiators for acrylic monomers. Initiators contain one or more labile bonds that cleave homolytically when sufficient energy is supplied to the molecule. The energy must be greater than the bond dissociation energy (BDE) of the labile bond, as described in the Kirk- Othmer Encyclopedia of Chemical Technology. Energetic free radicals are formed during thermal decomposition of the organic peroxide. Metal catalysts such as cobalt naphthenate are known accelerators that will speed up the cure or ensure a more efficient conversion of monomer to polymer. These energetic free radicals are known to abstract hydrogen, attack unsaturations or interact with stabilizers. Other times, it is desirable to avoid attack to additives such as photochromic materials.

The thermal decomposition or thermolysis mechanism for a particular peroxide depends upon the molecular structure, primarily electronic and steric effects. The radical's ability to exist is based on its stability as a radical. For example, if the peroxide is stable at room temperature, it prefers to exist as the peroxide molecule. A peroxide that is refrigerated prefers to decompose to the radical, the radical is the lower energy state.

As the bond dissociation energy decreases, the radical stability increases. To abstract a hydrogen from a benzene molecule would require 113.1 Kcal/mol. The radical is highly energetic and unstable. Whereas to abstract a hydrogen from a t-butyl molecule is much lower at 96.6 Kcal/mol, so the radical has less energy (softer) and it is more likely to be able to abstract this hydrogen. A list of Relative Radical Stabilities is shown in Table 1, in which certain values are cited from the *Handbook of Chemistry & Physics*, 81$^{st}$ Ed. or were provided by Arkema Inc.

TABLE 1

| Structure | Bond Dissociation Energy (kcal/mole) at 298K | Radical | |
|---|---|---|---|
| H—C$_6$H$_5$ | 113.1 | phenyl | |
| H—O(CO)C$_6$H$_5$ | 106.1 | benzoyloxy | Decreasing radical energy |
| H—(CO$_2$)O—EH-2 | ~106 | 2-EHOCO2 | |
| H—OC(CH$_3$)$_3$ | 105.1 | t-butoxy | |
| H—CH$_3$ | 104.9 | methyl | |
| H—O—EH-2 | ~104.9 | 2-EHO | |
| H—OC$_2$H$_5$ | 104.6 | ethoxy | |
| H—OCH$_3$ | 104.2 | methoxy | |
| H—OCH$_2$C(CH$_3$)$_3$ | 102.3 | t-amyloxy | |
| H—CH$_2$CH$_3$ | 101.1 | ethyl | |
| H—CH$_2$C(CH$_3$)$_3$ | 99.9 | t-amyl | |
| H—C(CH$_3$)$_3$ | 96.6 | t-butyl | |
| H—OCC$_6$H$_5$ | 87 | benzoyl | |
| H—OC$_6$H$_5$ | 86.4 | phenoxy | |

Table 1 is organized to show increasing radical stability (decreasing radical energy) as one moves down the listing. The thermal decompositon of some initiators used are shown.
Luperox P: (t-butylperoxybenzoate)

T-butylperoxybenzoate (Luperox P) thermal decomposition is described in the Arkema Peroxyesters Product Bulletin as among the commercial peroxyesters of peroxybenzoic acids to decompose by a mechanism that initially gives acyloxy and alkoxy radicals, after which decarboxylation or β-scission often occurs. T-butylperoxybenzoate decomposes into a benzoyloxy radical and a t-butoxy radical.

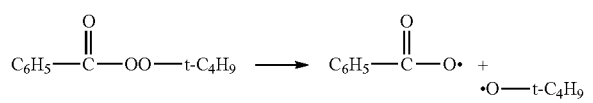

The benzoyloxy can further decarboxylate kinetically to a higher energy phenyl radical (113.2 Kcal/mol) and carbon dioxide.

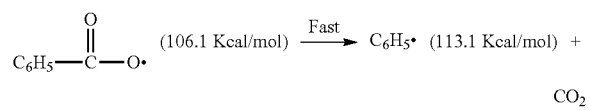

While the t-butoxy radical (105.1 Kcal/mol) may further decompose by β-scission to a methyl radical (104.9 Kcal/mol), it would be a very slow reaction as the driving force is low with ΔH=0.2 Kcal/mol.

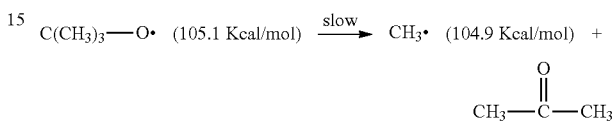

Luperox TAEC: OO-t-amyl-O-(2-ethylhexyl)monoperoxycarbonate (t-amylperoxy-2-ethylhexylcarbonate)

OO-t-amyl-O-(2-ethylhexyl)monoperoxycarbonate (Luperox TAEC) thermally decomposes into a t-amyloxy radical and a 2-ethylhexyloxycarbonate (2-EHOCO2) radical.

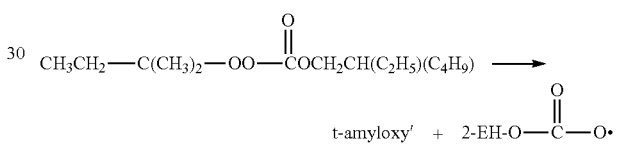

After the oxygen-oxygen bond cleavage, the t-amyloxy radical (102.3 Kcal/mol) can further decompose by β-scission to the ethyl radical (101.1 Kcal/mol) which is fast as ΔH=1.2 Kcal/mol.

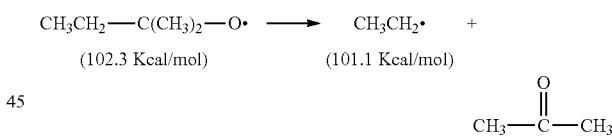

The 2-ethylhexyloxycarbonate (2-EHOCO2) radical can decarboxylate to a 2-ethylhexyloxy (2-EHO) radical which is fast as ΔH=1.1 Kcal/mol.

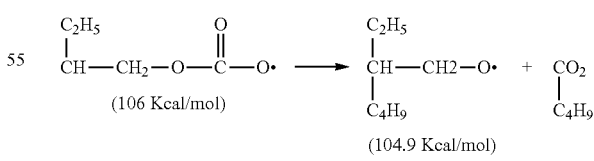

Luperox TBEC: OO-t-butyl-O-(2-ethylhexyl)monoperoxycarbonate (t-butylperoxy-2-ethylhexylcarbonate)

OO-t-butyl-O-(2-ethylhexyl)monoperoxycarbonate (Luperox TBEC) thermally decomposes into
a t-butoxy radical and a 2-ethylhexyloxycarbonate (2-EHOCO2) radical.

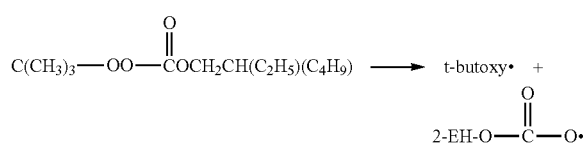

As described in the decomposition products of Luperox P, after the oxygen-oxygen bond cleavage, the t-butoxy radical (105.1 Kcal/mol) can further decompose by β-scission to the methyl radical (104.9 Kcal/mol) but this is a fairly slow or unlikely reaction as ΔH=0.2 Kcal/mol.

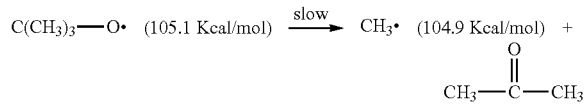

As described for Luperox TAEC, the 2-ethylhexyloxycarbonate (2-EHOCO2) radical can decarboxylate to a 2-ethylhexyloxy (2-EHO) radical which is fast with ΔH=1.1 Kcal/mol.

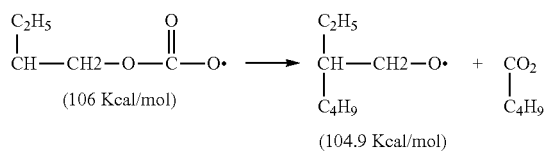

Surprisingly, it was found that polymerization of a photochromic acrylic coating can be achieved with low yellow color. A basic photochromic formulation is shown in Table 2.

TABLE 2

| | Weight (g) |
|---|---|
| cobalt naphthenate (a) | 0.25 (phm) |
| photochromic PC-A (b) | 3 (phm) |
| benzyl acrylate (c) | 20 |
| Ebecryl 284N (d) | 20 |
| Ebecryl 1290 (e) | 30 |
| Ebecryl 8411 (f) | 30 |
| Organic peroxide (g) | 1.5 (phm) |

(a) Sigma-Aldrich
(b) combination of photochromic materials (PC-A) to give a gray color upon UV exposure included: 45 weight percent of an indeno-fused naphthopyran that exhibited a blue color when irradiated with ultraviolet light (UV); 35 weight percent of an indeno-fused naphthopyran that exhibited a blue-green color when irradiated with UV; and 20 weight percent of an indeno-fused naphthopyran that exhibited a yellow-brown color when irradiated with UV.
(c) Alfa-Aesar
(d) (e), (f) Cytec
(g) Arkema The components in Table 2 are combined and mixed thoroughly to yield a photochromic coating.

A coated lens was made by the process in which a thermoplastic segmented lens substrate is first injection molded. The thermoplastic is polycarbonate. The mold block opens and photochromic coating from Table 2 is applied to the front surface of the segmented polycarbonate lens. The mold block then closes which serves two (2) purposes. First, when the mold block closes, it spreads the coating over the front convex (CX) surface of the segmented polycarbonate lens to provide a uniform thickness. Secondly, the mold block will provide suitable heat to cure the photochromic coating from Table 2. The mold block remains in contact with the coating for 1-minute to produce a photochromic coated lens.

The photochromic lens was conditioned by exposure to UV to darken followed by a bleaching step in order to erase any exposure the photochromic may have seen previous to testing. Those skilled in the art are familiar with the conditioning of lenses for photochromic testing. One manner of conditioning lenses is described in U.S. Pat. No. 7,320,826, column 42, lines 4 to 16. It should be understood that the intensity of the lights and the time of exposure may be varied to achieve conditioning of the lenses.

The photochromic lenses were measured for color using a Perkin-Elmer Lambda 900 to provide b* (yellow). Surprisingly, the photochromic coatings that were initiated using Luperox TAEC and Luperox TBEC have lower b* yellow of 4.7 and 2.9 respectively as reported in Table 3. The photochromic coating initiated using Luperox P shows a higher b* yellow of 6.8. A value of less than 5 is desired and more so a value less than 4 is preferred. Lupersol P differs from TAEC or TBEC in that it thermally decomposes to a benzoyloxy (BO) radical (106 Kcal/mol) which further decomposes to a high energy phenyl radical (113.1 Kcal/mol) which are thought to attribute to the high yellow color. The possible radical species for each initiator are shown in Table 3 below, along with the b* yellow value corresponding to the photochromic coating.

TABLE 3

| | Free Radical Products | | | | | | | | Highest Energy |
|---|---|---|---|---|---|---|---|---|---|
| Organic Peroxide | t-amyloxy | t-butoxy | BO | 2-EHOCO2 | methyl | ethyl | 2-EHO | Phenyl | b* yellow | radical(Kcal/m) |
| Luperox TAEC (b) | x | | | X | | x | x | | 4.7 | 106 |
| Luperox TBEC (a) | | x | | X | x | | x | | 2.9 | 106 |
| Luperox P (c) | | x | x | | x | | | X | 6.8 | 113.1 |

(a) Arkema OO-t-butyl-O-(2-ethylhexyl)monoperoxycarbonate
(b) Arkema OO-t-amyl-O-(2-ethylhexyl)monoperoxycarbonate
(c) Arkema t-butylperoxybenzoate The photochromic lens was measured on a Bench for Measuring Photochromics (BMP) optical bench made by Essilor, France, in accordance with the procedure disclosed in U.S. Pat. No. 7,320,826 at column 42, line 17 to column 43, line 30, except that the temperature dependence was not measured. The disclosure on the BMP testing is incorporated herein by reference. Color and optical density are measured while UV light activates the photochromic over a 15 minutes time period. The light is shut off, the photochromic bleaches and the color and optical density continue to be measured. We report the amount of light transmission after 15-minutes of UV exposure as % T dark 15 min. This tells us the relative darkening intensity. The rate at which darkening occurs is reported as T½ dark and the rate at which the photochromic bleaches is T½ fade. The T½ fade is the time interval in seconds for the ΔOD of the activated form of the photochromic compound in the test lens to reach one half the highest ΔOD after removal of the source of activating light. The T½ dark is the time interval in seconds of irradiation that it takes to achieve 50% of the change in optical density (ΔOD) obtained after 15 minutes of irradiation.

Table 4 shows the photochromic performance T½ fade is significantly longer at 120 seconds using Luperox P.

TABLE 4

| Organic Peoxide | % T dark 15 min | T ½ dark | T ½ fade |
|---|---|---|---|
| Luperox TBEC (a) | 16 | 24 sec | 99 sec |
| Luperox TAEC (b) | 13 | 23 sec | 85 sec |
| Luperox P (c) | 14 | 29 sec | 122 sec |

(a) Arkema OO-t-butyl-O-(2-ethylhexyl)monoperoxycarbonate
(b) Arkema OO-t-amyl-O-(2-ethylhexyl)monoperoxycarbonate
(c) Arkema t-butylperoxybenzoate Another acrylic photochromic formulation is shown in Table 5. In this case, Akzo Triganox 131 t-amylperoxy-2-ethylhexylmonoperoxycarbonate (comparable to Luperox TAEC) was used.

TABLE 5

| | Weight (g) |
|---|---|
| cobalt naphthenate (a) | 0.25 |
| photochromic PC-A (b) | 3.0 |
| organic peroxide (c) | 1.5 |
| SR423A (d) | 1.0 |
| benzyl acrylate (e) | 19.0 |
| SR399LV (f) | 30 |
| CN965 (g) | 50 |
| Optional additives* | |
| Carbothane 3575A (h) | 1.0 |
| HALS (i) | 1.0 |

(a) Sigma-Aldrich
(b) photochromic materials chosen to give a gray color upon UV exposure (PC-A) as described hereinbefore
(c) Akzo: Triganox 131 t-amylperoxy-2-ethylhexylcarbonate
(d) Sartomer isobornyl methacrylate
(e) Sans Ester
(f) Sartomer dipentaerythritolpentaacrylate
(g) Sartomer aliphatic polyester urethane diacrylate
(h) Lubrizol Carbothane 3575A
(i) hindered amine light stabilizer
*Note those skilled in the art are familiar with the incorporation of additives. Such additives can be thermoplastic urethanes (TPU), hindered amine light stabilizers (HALS), antioxidants (AO), flow enhancing surfactants, leveling agents amongst others.

Table 6 shows Photochromic Coating Performance and includes b* at <4.0 using Triganox 131 with or without the inclusion of Carbothane 3575A TPU. The TPU can be dissolved into monomers in an amount from 0.5 phm to 5.0 phm to increase viscosity or provide other useful properties. Akzo Triganox 131 is chemically the same as Arkema Luperox TAEC.

TABLE 6

| Example | Carbothane 3575A | b* | 200 hr SunTest |
|---|---|---|---|
| 6a | none | 3.45 | Pass |
| 6b | 1phm | 3.10 | Pass |

The SunTest is conducted by placing coated lenses into an Atlas Suntest CPS+ for 200 hours exposure and removed at predetermined intervals. Coating adhesion was tested by scoring the coating with a multi-razorblade device and then scoring again at 90 degrees. Tape was applied to the scored area and the tape was pulled. Adhesion passes if no coating is removed with the tape.

The above description provides general and specific guidelines for forming acrylate-based photochromic coating compositions. The compositions provide low yellowness coatings for thermoplastic lenses. They can be complemented with various dyes. A key component is the use of an organic peroxide having a free radical energy below 113 kcal/mol. For example, peroxyesters having free radical energy levels below 110 kcal/mol, or in a range from about 100 to 106 kcal/mol may be used. It was discovered that free radicals with too high of an energy level can cause the radicals to interact with other components in the composition. The result of such interactions was observed as unacceptably high yellowness. The discovery is of particular value in protecting photochromic dye molecules from being attacked or damaged. The discovery is also applicable in protecting all dyes molecules from being attacked or damaged by free radical having too high of an energy level. The composition is well suited for use in a post-injection coating process, where the mold is used to spread the composition into a uniformly thin layer across the convex surface of the lens. This process uses the residual beat from the molten thermoplastic and the mold to cure the composition into a solid, abrasion resistant coating. The in-mold process also allows the coating to achieve a high degree of conformity to the surface of bifocals, at the segment ridge. References to segmented lenses and multifocal lens means lenses having a ridge, which we also refer to as a lens surface discontinuity. These factors allow photochromic bifocal lens to be efficiently manufactured. Throughout the specification there are parenthetical references to (meth)acrylates. This notation refers to, and includes, the acrylate compound or the corresponding methacrylate version.

For all of the following examples, these thermally curable photochromic coating formulations were applied according to the post injection in-mold press coating process described above. It is preferred to obtain an optical article with high % T in the clear or non-colored state, good darkening, low yellow, fast fade back (bleaching) and low photochromic degradation (fatigue).

Table 7 shows various formulations using Cytec Ebecryl monomers. Various catalysts such as Tin-2-ethylhexanoate, King Industries K-Kat 348 bismuth carboxylate and Cobalt-naphthenate are used. Hostavin PR-31 HALS or a HALS-1 is used with or without Ciba Irganox 1010 AO. Combinations of photochromic compounds that demonstrate a gray color (PC-A and PC-B) upon activation were used.

TABLE 7

Cytec Ebecryl Formulations

| Sample | Sn-2-EH | K-Kat348 | Co—N | PR-31 | HALS-1 | Irg 1010 | PC-A | PC-B | SR506 | HPMA | 284N | 1290 | 8411 | Trig 131 |
|---|---|---|---|---|---|---|---|---|---|---|---|---|---|---|
| 1 | 0.14 phm | | | | 1 phm | 0.25 phm | | 2.5 phm | 5% | 10% | 18% | 33% | 34% | 1.5 phm |
| 2 | 0.14 phm | | | 1 phm | | 0.25 phm | | 2.5 phm | 5% | 10% | 18% | 33% | 34% | 1.5 phm |
| 3 | | 0.27 phm | | 1 phm | | | 3.0 phm | | 5% | 10% | 18% | 33% | 34% | 1.5 phm |
| 4 | 0.14 phm | | | 1 phm | | 0.25 phm | 3.0 phm | | 5% | 10% | 18% | 33% | 34% | 1.5 phm |
| 5 | | | 0.25 phm | | 1 phm | 0.25 phm | 3.0 phm | | 5% | 10% | 18% | 33% | 34% | 1.5 phm |

Sn-2-EH: Tin-2-ethylhexanoate catalyst (Aldrich).
K-Kat 348: Bismuth carboxylatye catalyst (King Industries).
Co—N: cobalt naphthenate catalyst (Aldrich).
Hostavin PR-31: Propandioic acid, [(4-methoxyphenyl)-methylene]-, bis(1,2,2,6,6-pentamethyl-4-piperidinyl) ester (Clarient).
HALS-1: phenyl-(3,5-di-tert.butyl-4-hydroxy-benzyl)-malonic acid-bis-(1,2,2,6,6-penta-methyl-4-piperidinyl)ester prepared as described U.S. Pat. No. 4,198,334 at column 14, line 59 to column 21, line 29, which disclosure is incorporated herein by reference.
Irganox 1010: Pentaerythritol Tetrakis(3-(3,5-di-tert-butyl-4-hydroxyphenyl)propionate) hindered phenolic antioxidant (Ciba).
PC-A: previously described.
PC-B: Included: 5 weight percent of an indeno-fused naphthopyran that exhibited a blue-purple color when irradiated with ultraviolet light (UV); 10 weight percent of indeno-fused naphthopyrans that exhibited a blue color when irradiated with ultraviolet light (UV); 35 weight percent of a different indeno-fused naphthopyran that exhibited a blue color when irradiated with ultraviolet light (UV); 27 weight percent of an indeno-fused naphthopyran that exhibited a green-gray color when irradiated with ultraviolet light (UV); 23 weight percent of an indeno-fused naphthopyran that exhibited a green color when irradiated with ultraviolet light (UV).
SR506: isobornylacrylate (Sartomer).
HPMA: hydroxypropylmethacrylate (Aldrich).
284N: Ebecryl 284N aliphatic urethane diacrylate (Cytec) aliphatic urethane diacrylate diluted with a reactive diluent 1,6-hexanediol diacrylate.
1290: Ebecryl 1290 hexafunctional aliphatic urethane acrylate (Cytec).
8411: Ebecryl 8411 aliphatic urethane diacrylate (Cytec) aliphatic urethane diacrylate diluted with a reactive diluent isobornyl acrylate.
Triganox 131: tert-amylperoxy-2-ethylhexyl carbonate organic peroxide (Akzo).

Photochromic performance was measured using a BMP as previously described. Photochromic lenses are first conditioned (darkened then bleached) and initial transmission (Y) and color (a*, b*) is measured. The photochromic is activated using a UV light source. After 15 minutes, the transmission is measured (% Tdark). The UV light source is shut off and a visible light source is turned on and the photochromic bleaches over a period of time. The amount of time it takes to reduce optical density by 50% is recorded (T½). The transmission and color are continually monitored providing a darkening and fading rate and color diagram. Lenses are aged in a Weather-o-meter and the photochromic breakdown is monitored as % fatigue based on optical density loss and the change in yellow as Δb* in accordance with the procedure disclosed in U.S. Pat. No. 6,998,072 at column 33, line 49 to column 34, line 11, which disclosure is incorporated herein by reference Table 8 shows that formulas 1-5 preferred as they provide very good bleach transmission, low yellow color, good darkening, good fade kinetics and low photochromic fatigue <15%.

TABLE 8

Ebecryl Formulation Results, 60 sec. cure unless noted

| Sample | Y | b* | % Tdark | T½ bleach | % Fatigue | Δb* | |
|---|---|---|---|---|---|---|---|
| 1 | 83.9 | 1.7 | 12.3 | 77 | 13.9 | 2.2 | |
| 2 | 82.7 | 1.7 | 13.2 | 89 | 14.4 | 3.3 | 120 sec cure |
| 3 | 81.5 | 1.6 | 14.8 | 60 | 10.8 | 3.7 | |
| 4 | 80.0 | 1.5 | 15.5 | 61 | 5.6 | 3.0 | 120 sec. cure |
| 5 | 81.7 | 2.0 | 14.8 | 59 | 7.7 | 3.3 | |

Table 9 shows various formulations using Sartomer monomers. Various catalysts such as Tin-2-ethylhexanoate, King Industries K-Kat 348 bismuth carboxylate and Cobalt-naphthenate are used. Hostavin PR-31 HALS or HALS-1 is used with or without Ciba Irganox 1010 AO. Combinations of photochromic compounds that demonstrate a gray color (PC-A and PC-B) upon activation were used.

TABLE 9

Sartomer Formulations

| Sample | Sn-2-EH | Co—N | HALS-1 | Irg1010 | PC-A | SR506 | BzA | HPMA | SR-399 | CN-965 | Trig 131 |
|---|---|---|---|---|---|---|---|---|---|---|---|
| 6 | | 0.20 phm | 1 phm | 0.50 phm | 3.0 phm | 1% | 21% | | 22% | 56% | 1.5 phm |
| 7 | | 0.25 phm | 1 phm | 0.50 phm | 3.0 phm | 1% | | 21% | 22% | 56% | 1.5 phm |
| 8 | 0.14 phm | | 1 phm | 0.25 phm | 2.5 phm | 1% | 15% | | 22% | 62% | 1.5 phm |

Sn-2-EH: Tin-2-ethylhexanoate catalyst.
Co—N: cobalt naphthenate catalyst.
HALS-1: previously described.
Irganox 1010: Pentaerythritol Tetrakis(3-(3,5-di-tert-butyl-4-hydroxyphenyl)propionate) hindered phenolic antioxidant.
PC-A: previously described.
SR506: Sartomer isobornylacrylate monomer.
BzA: Alpha Aesar Benzyl acrylate monomer.
HPMA: Aldrich hydroxypropylmethacrylate monomer.
SR-399: Sartomer dipentaerythritol pentaacrylate monomer.
CN-965: Sartomer aliphatic polyester based urethane diacrylate oligomer.
Trig 131: tert-Amylperoxy-2-ethylhexyl carbonate organic peroxide.

Table 10 shows that formulas 7 and 8 are preferred as they provide very good bleach transmission, low yellow color, good darkening, good fade kinetics and low photochromic fatigue <15%.

TABLE 10

Sartomer Formulation Results, 60 sec cure

| Sample | Y | b* | % Tdark | T½ bleach | % Fatigue | Δb* |
|---|---|---|---|---|---|---|
| 6 | 79.6 | 4.1 | 13.9 | 53 | 10.7 | 4.1 |
| 7 | 81.2 | 1.7 | 13.2 | 48 | 6.1 | 3.7 |
| 8 | 80.8 | 1.7 | 13.7 | 49 | 5.8 | 4.1 |

The organic peroxide radicals are necessary to accelerate monomer curing. However, the free radicals possess the potential to adversely interfere with other compounds within the coating. Antioxidants consume free radials. The formulations according to the invention surprisingly provide a balance between providing protection from the free radicals without substantially effecting the radicals function in the monomer curing process.

The inclusion of Tin-2-ethylhexanoate (Sn-2-EH) as catalyst represents an improvement because it is provided in a colorless liquid. Some other metal catalysts require colored or oil-based solvents, which can cause problems in optical applications. The Sn-2-EH resists coalescing and is able to dissolve in the coating monomers.

Furthermore, the formulations described herein are suitable for use in a post injection in-mold press coating process. To summarize, the coating formulations are based on the following combination of ingredients:
Photochromic materials
Antioxidant (AO)
Metal salt catalyst
Initiator
Hindered amine light stabilizer
Monomers comprising at least one monofunctional (meth)acrylate and one multifunctional (meth)acrylate.

As can be seen from the test results, the various embodiments of the acrylate based coating formulations provide numerous benefits. The formulations provide excellent photochromic performance. In a preferred embodiment, the improved photochromic performance is combined with a segmented bifocal lens made from polycarbonate. The formulation can be utilized in a post-injection in mold press coat lens process. This represents an increase in efficiency over conventional coating methods. The formulation can be employed in an industrial molding and coating process as will discussed further below.

As can be seen in the flowchart of FIG. 1, the steps in the left column relates to formulating the coating composition. The primary components used to formulate the acrylate-based coating in step 10 will be discussed in greater detail below. The selection of suitable alkylperoxides based on dissociation energy in step 12 is discussed in greater detail above. The right column relates to steps performed by, or with, the injection molding machine. The process is commenced with the closing of the mold, injecting resin in step 20 to provide a lens substrate, and optionally applying packing pressure. During this injection stage, a primary clamp force, of about 100 tons or more is utilized. Once the lens is rigid enough to sustain mold opening, the mold is opened, in step 22. Mold opening constitutes an upward vertical retraction of the movable side of the mold. This initial phase is conventional for injection molded lenses, for example, as described in U.S. Published Patent Application 2007/0138665. The substrate that could be used in this method could be any injection moldable lens material like PMMA, polycarbonate, polycarbonate/polyester blend, polyamide, polyurethane, polysulfone, cyclic olefin co-polymers, polystyrene, etc. In a preferred embodiment the substrate is polycarbonate.

The injecting step provides an afocal lens substrate, a single vision lens substrate, a multifocal lens, a bifocal lens substrate, a bifocal straight-top lens substrate, a trifocal lens substrate, a trifocal straight-top lens substrate, or a progressive lens substrate. In a preferred embodiment the lens is a segmented bifocal or trifocal lens.

One lens surface, for example the convex side, is exposed and facing upward. In step 24, the coating composition is applied to the exposed lens surface. The composition may be applied in step 24 a single, unpressurized charge, for example by a metering syringe mounted on a retractable arm that moves in between the open mold blocks. For lenses of all powers and configurations, the coating may be applied onto, or near, the center of the lens, off-center or at various locations. The lenses will all generally have a circular outer perimeter. One or more syringes may be employed to deposit coating composition, if the mold has 2, 4, or more lens molding cavities. After application of the composition and removal of the syringe, the movable mold half closes in step 26 to spread the coating across the entire upper lens surface. The coating is spread radially outwardly from the center, or near the center, of the lens, out to the circular periphery. During this cure stage, a secondary clamp force, less than or equal to the primary clamp force may be utilized. After the coating is cured, and the lens has solidified sufficiently, the mold is opened and the cured coated lens is ejected in step 28. The in-mold process is particularly well suited for coating a segmented bifocal lens. By re-clamping the mold to spread the coating, a uniformly thin layer is achieved and rapidly cured in situ. A high degree of mold replication assures that coating does not build up at the surface discontinuity. Coating build-up is a long standing problem when attempting to add a photochromically enabled coating to a segmented, bifocal lens.

In a preferred embodiment, the photochromic materials are present in an amount of from 2.0 to 4.0 phm, and preferentially of 2.5 phm. The preferred Antioxidant is Irganox 1010, and is present in an amount of 0.25 phm. The metal salt catalyst is either Sn-2-EH, Co-naphthenate or K-Kat348, and is present in an amount of 0.2 phm. The initiator is t-arnylperoxy-2-ethylhexyl carbonate organic peroxide or t-butylperoxy-2-ethylhexylcarbonate. In a preferred embodiment, the initiator is Trig 131 (t-amylperoxy-2-ethylhexyl carbonate organic peroxide, present in an amount of 1.5 phm. The HALS is phenyl-(3,5-di-tert.butyl-4-hydroxy-benzyl)-malonic acid-bis-(1,2,2,6,6-penta-methyl-4-piperidinyl)ester or Hostavin PR-31. The preferred HALS is phenyl-(3,5-di-tert-.butyl-4-hydroxy-benzyl)-malonic acid-bis-(1,2,2,6,6-penta-methyl-4-piperidinyl)ester present in an amount of 1 phm.

The monomer blend comprises a mixture of at least two different monofunctional (meth)acrylate monomer and/or difunctional meth(acrylate) monomer selected from isobornylacrylate monomer (SR506), 2-hydroxypropyl-methacrylate monomer (HPMA), benzyl acrylate monomer (BzA), polyethyleneglycol (600) dimethacrylate (SR252), ethoxylated (8) bisphenol A dimethacrylate (CD542), ethoxylated (10) bisphenol A diacrylate (SR602), and ethoxylated (30) bisphenol A dimethacrylate (SR9036), polyethyleneglycol (400) diacrylate (SR344), polyethyleneglycol (400) dimethacrylate (SR603), polyethyleneglycol (600) diacrylate (SR610), ethoxylated (4) bisphenol A diacrylate (SR601), ethoxylated (4) bisphenol A dimethacrylate (SR540), ethoxylated (6) bisphenol A dimethacrylate (SR541), ethoxylated (10) bisphenol A dimethacrylate (SR480), ethoxylated (30) bisphenol A diacrylate (CD9038). The monomers from this category are present in an amount of 15% by weight.

Additionally, the monomer blend includes one multifunctional (meth)acrylate monomer selected from hexafunctional aliphatic urethane acrylate (Ebecryl 1290) and dipentaerythritol pentaacrylate monomer (SR399), (present in an amount of 33% by weight) and at least one aliphatic urethane diacrylate selected from Ebecryl 284N, Ebecryl 8411, and CN965 (present in an amount of 52% by weight).

The catalyst is a metal ester chosen from a large range of organic acid esters including alkane esters such as acetates, heptanoates, hexanoates, octoates, decanoates, oleates, stearates, oxalates, salicylates, linoleates and lactates. Aromatic esters such as naphthenates. Other non-limiting examples of suitable metal esters include bismuth naphthenate, calcium naphthenate, calcium octoate, cerium octoate, chromium octoate, cobalt octoate, copper naphthenate, copper octoate, ferric octoate, lead naphthenate, lead octoate, lithium neodecanoate, manganese naphthenate, manganese octoate, molybdenum naphthenate, molybdenum octoate, nickel octoate, potassium octoate, sodium naphthenate, sodium octoate, strontium octoate, vanadium naphthenate, vanadium octoate, Yttrium octoate, zinc naphthenate, zinc octoate and zirconium octoate. Metal salts are also known as soaps.

A preferred metal salt is Tin octoate (2-ethylhexanoate) which comes as a pure liquid with light straw yellow color and devoid of solvent, which makes it desirable for demanding optical coating applications. Another family organotins (tin-carbon bonds) used as catalysts are hydrated monobutyltin oxides which can include butyl chlorotin dihydroxide, butyltin tris (2-ethylhexoate), dibutyltin diacetate, dibutyltin oxide, dibutyltin dilaurate, dibutyltin dichloride, dibutyltin distearate, butyl stannoic acid, dioctyltin dilaurate and dioctyltin maleate, inter alia. A preferred metal salt is tin-2-ethylhexanoate, bismuth carboxylate, or cobalt naphthenate.

Antioxidants (AO) which are suitable for use in the coating according to the invention are described below. The preferred antioxidant is Irganox 1010.

Irganox 1010: Pentaerythritol Tetrakis(3-(3,5-di-tert-butyl-4-hydroxyphenyl)propionate)
Family: sterically hindered phenolic
100%, white powder

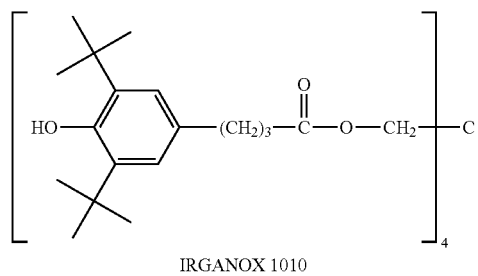

IRGANOX 1010

Irganox 1098: diamide derivative, N,N'-hexane-1,6-didiylbis (3,5-di-tert-butyl-4-hydroxyphenylpropionamide))
Family: sterically hindered phenolic
100%, white powder

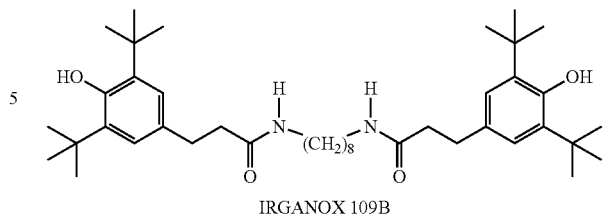

IRGANOX 109B

Irganox 245: Ethylenebis(oxyethylene)bis-(3-(5-tert-butyl-4-4-hydroxy-m-tolyl)-propionate)
Family: sterically hindered phenolic
50%-100%, white powder

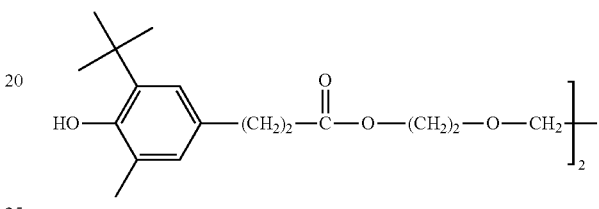

IRGANOX 245

The HALS (Hindered Amine Light Stabilizer) which are suitable for use in the coating formulations possess hindered phenolic antioxidant properties. The preferred HALS is phenyl-(3,5-di-tert.butyl-4-hydroxy-benzyl)-malonic acid-bis-(1,2,2,6,6-penta-methyl-4-piperidinyl)ester. These compounds are described more fully in U.S. Pat. No. 4,198,334. Surprisingly, it was discovered that the (a) choice of photochromic material and concentration, (b) in combination with the choice of Hals and (c) in further combination with the choice of the monomer system (Ebecryl) is very important to improve the photochromic level and properties of the lens in term of % T dark, % T bleach, photochromic fatigue and yellow residual color.

The photochromic materials can include the following classes of photochromic compounds: chromenes, e.g., naphthopyrans, benzopyrans, indenonaphthopyrans, phenanthropyrans or mixtures thereof; spiropyrans, e.g., spiro(benzindoline)naphthopyrans, spiro(indoline)benzopyrans, spiro (indoline)naphthopyrans, spiro(indoline)quinopyrans and spiro(indoline)pyrans; oxazines, e.g., spiro(indoline)naphthoxazines, spiro(indoline)pyridobenzoxazines, spiro(benzindoline)pyridobenzoxazines, spiro(benzindoline)naphthoxazines and spiro(indoline)benzoxazines; fulgides, fulgimides and mixtures of such photochromic compounds.

Non-limiting examples of chromenes are described in U.S. Pat. No. 5,458,814 at column 2, line 18 to column 9, line 5; U.S. Pat. No. 5,645,767 at column 2, line 16 to column 11, line 67; U.S. Pat. No. 5,656,206 at column 2, line 5 to column 13, line 50; U.S. Pat. No. 5,658,501 at column 2, line 5 to column 11, line 31; U.S. Pat. No. 5,698,141 at col. 2, line 11 to col. 19, line 19; U.S. Pat. No. 5,723,072 at column 2, line 27 to column 15, line 4; U.S. Pat. No. 6,022,497 at col. 2, line 21 to col. 10, line 60; U.S. Pat. No. 6,113,814 at column 2, line 23 to column 23, line 29; U.S. Pat. No. 6,153,126 at column 2, line 26 to column 8, line 8; U.S. Pat. No. 6,296,785 at column 2, line 55 to column 30, line 27; U.S. Pat. No. 6,340, 766 at column 3, line 12 to column 13, line 19; U.S. Pat. No. 6,348,604 at column 3, line 35 to column 16, line 37; U.S. Pat. No. 6,353,102 at column 2, line 3 to column 11, line 7; U.S. Pat. No. 6,555,028 at column 2, line 40 to column 24, line 55;

U.S. Pat. No. 7,342,112 at column 2, line 38 to column 78, line 13; U.S. Pat. No. 7,465,415 at column 8, line 58 to column 74, line 64; U.S. Pat. No. 7,527,754 at column 2, line 65 to column 16, line 10; U.S. Patent Publication 2006/0228557 at paragraph [0007] to [0115]; U.S. Patent Publication 2007/0138449 at paragraph [0010] to [0101]; and U.S. Patent Publication 2008/0103301 at paragraph [0007] to [0115]. The disclosures of the aforementioned patents on chromene photochromic materials are incorporated herein by reference.

Non-limiting examples of spiropyrans are described in U.S. Pat. No. 4,931,220 at column 11, line 66 to column 13, line 20; U.S. Pat. No. 5,236,958 at column 1, line 43 to column 7, line 43; and U.S. Pat. No. 5,252,742 at column 1, line 45 to column 6, line 60. The disclosures of the aforementioned patents on spiropyrans are incorporated herein by reference. Spiro(indoline)pyrans are also described in the text, Techniques in Chemistry, Volume III, "Photochromism", Chapter 3, Glenn H. Brown, Editor, John Wiley and Sons, Inc., New York, 1971.

Non-limiting examples of oxazines are described in U.S. Pat. No. 4,637,698 at column 1, line 40 to column 2, line 23; U.S. Pat. No. 4,931,219 at column 1, line 45 to column 7, line 9; U.S. Pat. No. 5,166,345 at column 3, line 36 to column 7, line 42; and U.S. Pat. No. 5,821,287 at column 3, lines 7 to 51. The disclosures of the aforementioned patents on oxazines are incorporated herein by reference.

Non-limiting examples of fulgides and fulgimides are disclosed in U.S. Pat. No. 4,685,783 at column 1, line 57 to column 5, line 27; U.S. Pat. No. 4,931,220 at column 21, line 39 to column 22, line 40; and U.S. Pat. No. 5,359,085 at column 5, line 26 to column 19, line 45. The disclosures of the aforementioned patents on fulgides and fulgimides are incorporated herein by reference.

The photochromic materials described herein can be chosen from a variety of non-limiting examples which include: of course, a single photochromic compound; a mixture of photochromic compounds; a material comprising at least one photochromic compound, such as a plastic polymeric resin or an organic monomeric or oligomeric solution; a material such as a monomer or polymer to which at least one photochromic compound is chemically bonded; a material comprising and/or having chemically bonded to it at least one photochromic compound, the outer surface of the material being encapsulated (encapsulation is a form of coating), for example with a polymeric resin or a protective coating such as a metal oxide that prevents contact of the photochromic material with external materials such as oxygen, moisture and/or chemicals that have a negative effect on the photochromic material, such materials can be formed into a particulate prior to applying the protective coating as described in U.S. Pat. Nos. 4,166,043 and 4,367,170; a photochromic polymer, e.g., a photochromic polymer comprising photochromic compounds bonded together; or mixtures thereof.

The above description provides general guidelines and specific formulations for acrylate-based photochromic coating compositions. The compositions result in coatings having low yellowness and high photochromic performance for thermoplastic lenses. The composition is well suited for use in a post-injection in-mold press coating process, where the mold is used to spread the composition into a uniformly thin layer across the convex surface of the lens. This process uses the residual heat from the molten thermoplastic and the mold to cure the composition into a solid, abrasion resistant coating. The in-mold process also allows the coating to achieve a high degree of conformity to the surface of bifocals, at the segment ridge. References to segmented lenses and multifocal lens means lenses having a ridge, which we also refer to as a lens surface discontinuity. These segmented lenses are also referred to as straight-top bifocal lenses. These factors allow photochromic bifocal lens to be efficiently manufactured. Throughout the specification there are parenthetical references to (meth)acrylates. This notation refers to, and includes, the acrylate compound or the corresponding methacrylate version.

Having described preferred embodiments for lens manufacturing, materials used therein and methods for processing the same (which are intended to be illustrative and not limiting), it is noted that modifications and variations can be made by persons skilled in the art in light of the above teachings. It is therefore understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A thermally curable photochromic coating composition comprising:
    a mixture having two different classes of monomers, where the two classes of monomers are selected from the group consisting of: (a) monofunctional (meth)acrylate; (b) difunctional (meth)acrylate; (c) a combination of a monofunctional (meth)acrylate and a difunctional (meth)acrylate; (d) multifunctional (meth)acrylate; and (e) aliphatic urethane diacrylate;
    a metal salt catalyst;
    a Hindered Amine Light Stabilizer (HALS) selected from the group consisting of propanedioic acid [(4-(methoxyphenyl)-methylene]-bis(1,2,2,6,6-pentamethyl-4-piperidinyl) ester and phenyl-(3,5-di-tert.butyl-4-hydroxbenzyl)-malonic acid-bis-(1,2,2,6,6-penta-methyl-4-piperidinyl)ester;
    an antioxidant;
    an initiator; and
    a photochromic dye.

2. The composition according to claim 1, wherein the metal salt is selected from the group consisting of a metal ester of 2-naphthoic acid, a metal ester of 2-ethylhexanoic acid, a metal ester of octoate material, tin-2-ethylhexanoate, bismuth carboxylate, cobalt naphthenate and combinations thereof.

3. The composition according to claim 1, wherein the HALS is phenyl-(3,5-di-tert.butyl-4-hydroxy-benzyl)-malonic acid-bis-(1,2,2,6,6-penta-methyl-4-piperidinyl)ester.

4. The composition according to claim 1, wherein the antioxidant is a sterically hindered phenolic compound or a pentaerythritol tetrakis[3-(3,5-di-tert-butyl-4-hydroxyphenyl)propionate]hindered phenolic compound.

5. The composition according to claim 1, wherein the initiator is selected from the group consisting of an organic peroxide which presents a free radical energy less than about 113 kcal/mol at 298 K, t-amylperoxy-2-ethylhexyl carbonate organic peroxide, and t-butylperoxy-2-ethylhexylcarbonate.

6. The composition according to claim 1, wherein the monofunctional (meth)acrylate is selected from the group consisting of isobornylacrylate, hydroxypropylmethacrylate, benzyl acrylate and combinations thereof.

7. The composition according to claim 1, wherein the difunctional (meth) acrylate is selected from the group consisting of polyethyleneglycol (600) dimethacrylate, ethoxylated (8) bisphenol A dimethacrylate, ethoxylated (10) bisphenol A diacrylate, and ethoxylated (30) bisphenol A dimethacrylate.

8. The composition according to claim 1, wherein the multifunctional (meth)acrylate is selected from the group consisting of hexafunctional aliphatic urethane acrylate and dipentaerythritol pentaacrylate.

9. The composition according to claim 1, wherein the aliphatic urethane diacrylate is selected from the group consisting of aliphatic polyester urethane diacrylate, aliphatic urethane diacrylate diluted with a reactive diluent 1,6-hexanediol diacrylate, aliphatic urethane diacrylate diluted with a reactive diluent isobornyl acrylate and combinations thereof.

10. A thermally curable photochromic coating composition comprising:
one or more monomers independently selected from the group consisting of (a) monofunctional (meth)acrylate; (b) difunctional (meth)acrylate; and (c) a combination of a monofunctional (meth)acrylate and a difunctional (meth)acrylate present in an amount from 10% to 25% by weight of the composition;
monomers of (d) multifunctional (meth)acrylate present in an amount from 20% to 40% by weight of the composition:
monomers of (e) aliphatic urethane diacrylate present in an amount from 50% to 70% by weight of the composition:
a metal salt present in an amount from 0.10 parts per hundred monomer (phm) to 0.30 phm;
a Hindered amine light stabilizer (FLALS) is present in an amount from 1.00 phm to 5.00 phm;
an antioxidant present in an amount from 0.20 phm to 0.50 phm;
an initiator present in an amount from 1.00 phm to 2.00 phm; and
a photochromic dye present in an amount from 1.00 phm. to 5.00 phm.

11. The composition according to claim 1, wherein the monomer of (a) monofunctional (meth)acrylate comprises a mixture of isobornyl acrylate in an amount from 1% to 5% by weight of the composition and benzyl acrylate or 2-hydroxypropylmethacrylate in an amount from 10% to 21% by weight of the composition.

12. A thermaly curable photochromic coating composition comprising:
a mixture of monomers including isobornylacrylate present in an amount of 5% by weight of the composition, hydroxypropylmethamlate present in an amount of 10% by weight of the composition, aliphatic urethane diacrylate present in an amount of 18% by weight of the composition, hexafunctional aliphatic urethane acrylate present in an amount of 33% by weight of the composition, and aliphatic urethane diacrylate present in an amount of 34% by weight of the composition:
a metal salt including tin-2-ethythexanoate present in an amount of 0.14 phm;
a Hindered amine light stabilizer (HALS) including bis (1,2,2,6,6-pentamethyl-4-piperidinyl)-[[3,5-bis-(1,1-dimethylethyl)-4-hydroxyphenyl]methyl]butylmalonate or phenyl-(3,5-di-tert.butyl-4-hydroxy-benzyl)-malonic acid-Ns-(1,2,2,6,6-penta-methyl-4-piperidinyl)ester present in an amount of 1 part per hundred monomer (phm);
an antioxidant including pentaerythritol tetrakis[3-(3,5-di-tert-butyl-4-hydroxyphenyl) propionate]hindered phenolic compound present in an amount of 0.25 phm;
an initiator comprises including t-amylperoxy-2-ethylhexyl carbonate organic peroxide present in an amount of 1.5 phin; and
a photochromic dye present in an amount of 2.0 to 4.0 phm.

13. The composition according to claim 1, further comprising a thermoplastic polyurethane (TPU) present in an amount from 0.5 parts per hundred monomer (phm) to 5.0 phm.

14. The composition according to claim 10, further comprising a thermoplastic polyurethane (TPU) present in an amount from 0.5 parts per hundred monomer (phm) to 5.0phm.

15. The composition according to claim 12, further comprising a thermoplastic polyurethane (TPU) present in an amount from 0.5 parts per hundred monomer (phm) to 5.0phm.

* * * * *